United States Patent [19]

Jenkins

[11] 4,097,758

[45] Jun. 27, 1978

[54] COAXIAL DISK STACK ACYCLIC MACHINE

[75] Inventor: Kenneth W. Jenkins, Clifton Park, N.Y.

[73] Assignee: General Electric Company, Schenectady, N.Y.

[21] Appl. No.: 710,926

[22] Filed: Aug. 2, 1976

[51] Int. Cl.² ............................................. H02K 31/00
[52] U.S. Cl. .................................... 310/178; 310/129; 310/219; 310/268
[58] Field of Search ............... 310/128, 129, 178, 219, 310/67, 268, 115, 116; 318/253; 322/48

[56] References Cited

U.S. PATENT DOCUMENTS

| 3,469,134 | 9/1969 | Beyersdorf | 310/268 |
| 3,585,398 | 6/1971 | Harvey | 310/178 |
| 3,916,235 | 10/1975 | Massar | 310/178 |
| 3,944,865 | 3/1976 | Jewitt | 310/178 |

FOREIGN PATENT DOCUMENTS

| 1,181,795 | 11/1964 | Germany | 310/178 |
| 1,072,143 | 6/1967 | United Kingdom | 310/178 |

*Primary Examiner*—R. Skudy
*Attorney, Agent, or Firm*—Nathan D. Herkamp; Joseph T. Cohen; Leo I. MaLossi

[57] ABSTRACT

A plural disk acyclic machine employs an outer axial stack of low reluctance, electrically conductive disks about an inner axial stack of such disks, both stacks being rotatable about a central shaft. Conductive means interconnect each disk in each stack, and an axially-directed magnetic field is established through each stack such that magnetic flux cuts rotatable disks along its path in the machine, except at the end caps of the machine.

14 Claims, 2 Drawing Figures

COAXIAL DISK STACK ACYCLIC MACHINE

INTRODUCTION

This invention relates to acyclic machines, and more particularly to lightweight homopolar machines employing disks and conventional field coils.

In a radial-type acyclic generator, a voltage is established across the radius of a conductive disk that rotates about an axis and extends between a pair of magnetic poles. In a radial-type acyclic motor, application of a current flowing across the radial surface of a conductive disk rotatable about an axis and situated between a pair of magnetic poles produces rotation of the disk. By stacking a plurality of disks on a common axis passing through their centers, and connecting in series the radial current path through each disk, generator voltage can be increased or motor torque can be increased, depending upon the acyclic machine mode of operation.

Radial-type acyclic machines conventionally employ iron disks which act as current conductors and also provide a low reluctance axial magnetic flux path so that suitable flux can be generated with copper field coils. Such machine includes a low reluctance flux return path through the stator outside the disk stack, which is typically comprised of iron. This flux return path thus contributes weight to the machine but does not act to provide any associated increase in generated voltage, when operating as a generator, nor any associated increase in torque output, when operating as a motor. If, however, the iron stator could be replaced with another disk stack, the returning flux would pass through the second set of disks, generating additional torque, in the case of a motor, or additional voltage, in the case of a generator. Therefore, substantially the only iron in the machine not actively used in producing motor torque or generator voltage would be that in the end caps. The present invention is directed to such machine.

In specific types of electric machinery, such as that employed for marine propulsion, weight is of crucial importance. Work to reduce weight of marine propulsion motors for certain craft has heretofore been directed toward developing homopolar motors utilizing superconducting magnets. However, superconducting machinery requires the added complexity of liquid helium supplies for normal operation. The present invention concerns a machine equivalent, in both weight and output, to a superconducting machine, but utilizing conventional copper magnet coils instead of superconducting magnets.

For advanced surface ships such as small wetted area twin hull (SWATH) craft and large hydrofoils, it is necessary to transmit propulsion power levels of about 40,000 horsepower from a bank of high-speed gas turbines through small struts to submerged pods. Typically, the turbine mechanical power appears at about 3,600 RPM on two or more horizontal turbine shafts. This power, at a variable speed of zero to 180 RPM for a SWATH, must be combined and transmitted down a 20 to 30 foot vertical distance to a horizontal propeller shaft. The restricted space available and the necessity for transmitting power around two right angles has created difficult design problems where gear drives are employed, adversely affecting reliability of such drives. Consequently, alternative approaches utilizing electric drives to provide a flexible transmission have been explored.

Although a d.c. drive would be desirable from a control point of view, the need to minimize weight aboard ship, together with the tight limitations of the SWATH pod, essentially preclude use of conventional d.c. machinery. In an effort to accommodate these constraints, use of homopolar machinery employing superconducting coils has been explored. In addition to the need for developing sea-going helium liquefaction equipment for such machines, the superconducting coil must be enclosed in a vacuum-jacketed dewar, adding further complexity to the machine. A nonsuperconducting homopolar motor with both weight and output torque comparable to that of a superconducting homopolar motor would eliminate need for a shipboard helium supply, and a simpler, more rugged motor would result.

For any radial-type acyclic motor, torque developed per disk equals the product of load current and total magnetic flux which passes through the disks and links the load current. Since maximum load current is fixed by the current source, torque developed by the motor is proportional to the number of disks in the machine and the total useful magnetic flux.

Because ferrous materials have a fairly definite saturation flux density, an increase in useful flux can be achieved only by increasing cross-sectional area of the iron magnetic circuit. Weight of the disk stack can be expressed approximately as $$W = (4\pi pt/BI) \times T$$

where
- $p$ = density of iron in the disk stack
- $t$ = disk thickness
- $B$ = saturation flux density of the iron
- $I$ = maximum load current
- $T$ = maximum rated motor torque.

Since rated torque and current are specified, weight of the disk stack can be reduced only by increasing saturation flux density or decreasing disk thickness. Some gain in saturation flux can be achieved by replacing conventional machine steel with an alloy exhibiting both low reluctance and low resistivity, such as an alloy comprising 50% iron and 50% cobalt, while disk thickness is set primarily by mechanical conditions of stiffness and the need to carry load current without excessive resistive heating.

For a conventional iron disk acyclic machine, weight of the iron in the axial portion of the stator having the same axial length as the disk stack is at least equal to weight of the disk stack because it must have at least the same cross-sectional area as the disk stack in order to carry the total machine flux. According to the present invention, this section of stator iron is replaced with a second, coaxial disk stack so that magnetic flux cuts disks everywhere in the machine except at the iron end pieces.

Accordingly, one object of the invention is to provide a radial-type acyclic machine in which rotatable disks are cut by magnetic flux everywhere along the flux path in the machine except at the ends of the machine.

Another object is to provide an acyclic motor exhibiting a high output torque for any predetermined motor size or weight.

Another object is to provide an acyclic generator exhibiting a high output voltage for any predetermined generator size or weight.

Briefly, in accordance with a preferred embodiment of the invention, a radial-type acyclic machine comprises a first plurality of low magnetic reluctance, electrically conductive disks centered about an axial shaft and positioned in a first axial stack rotatable about the shaft, and a second plurality of low magnetic reluctance, electrically conductive disks rotatable about the shaft and positioned in a second axial stack coaxially about the first axial stack. Conductive means interconnect each disk in each of the first and second plurality of disks, and means are provided for establishing an axially-directed magnetic field through each of the first and second pluralities of disks.

BRIEF DESCRIPTION OF THE DRAWINGS

The features of the invention believed to be novel are set forth with particularity in the appended claims. The invention itself, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
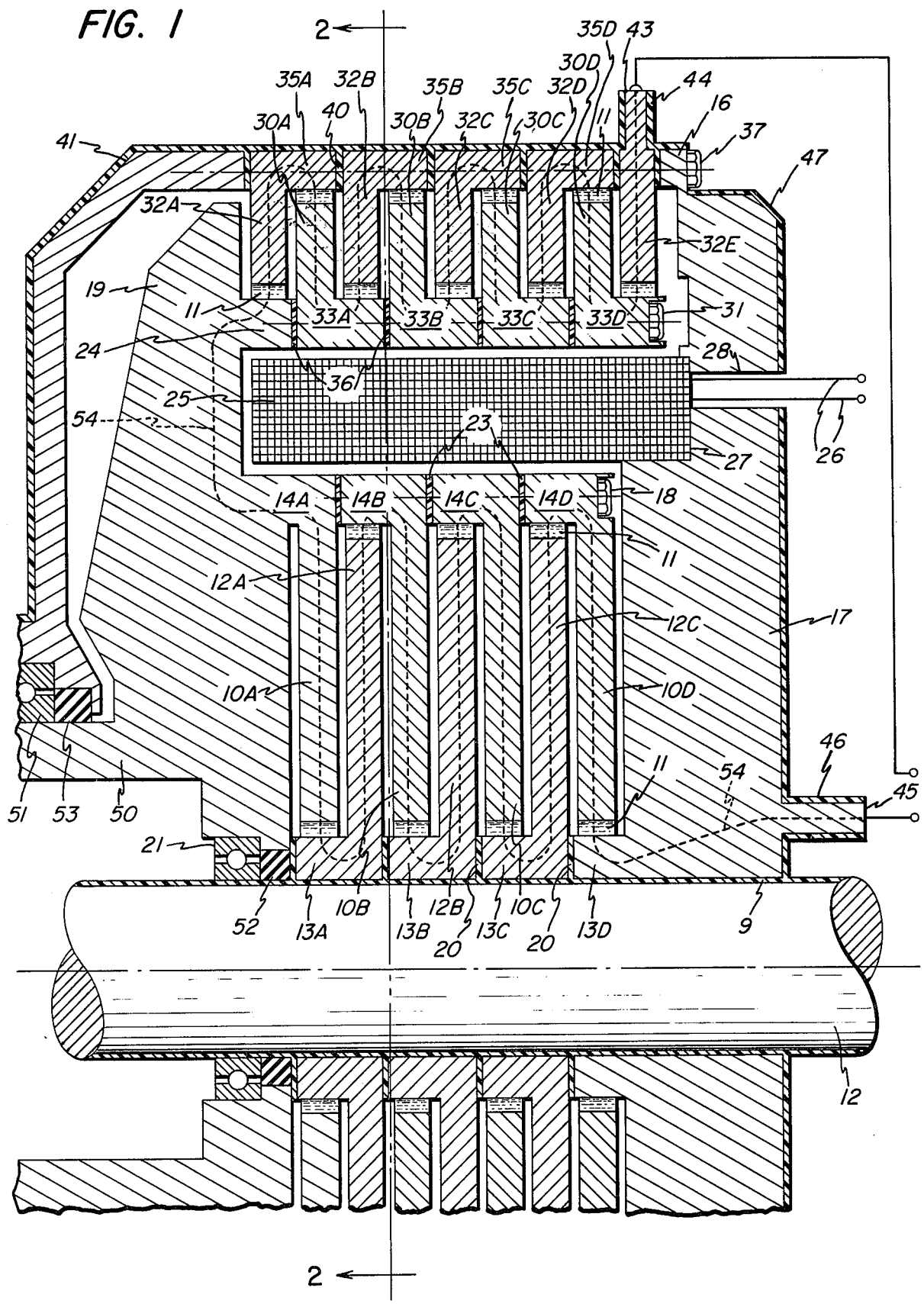
FIG. 1 illustrates a longitudinal section of a portion of an acyclic machine constructed in accordance with the present invention.

In FIG. 1, a cross-section of a portion of an acyclic machine is shown in schematic form as comprising a first pluraliity of disks 10A, 10B, 10C and 10D stacked axially and centered about a shaft 12 having an electrically-insulating coating 9 thereon, such as flame-sprayed alumina. For purposes of reference, shaft 12 is herein considered stationary, with disks 10A, 10B, 10C and 10D rotatable thereabout; however, those skilled in the art will recognize that shaft 12 may, alternatively, be rotatable, and the portions of the machine rotatable in relation to shaft 12 would then be stationary.

At their inner peripheries, each of disks 10A, 10B and 10C is positioned circumferentially about a collar portion 13A, 13B and 13C, respectively, of a second plurality of disks 12A, 12B and 12C, respectively, rigidly affixed to shaft 12, while disk 10D is positioned circumferentially about a collar portion 13D of electrically conductive magnetic pole piece 17 which is rigidly affixed to shaft 12. Each of rotatable disks 10B, 10C and 10D has a peripheral rim 14B, 14C and 14D, respectively, extending axially about the periphery of disks 12A, 12B and 12C, respectively, while rotatable disk 10A is joined integrally at its outer or peripheral portion 14A to electrically conductive magnetic pole piece 19 which is rotatable about shaft 12 by virtue of bearing 21. Each of pole pieces 17 and 19 is typically comprised of iron, or a 50% iron and 50% cobalt alloy.

Each of collar portions 13B, 13C and 13D is electrically insulated from disks 12A, 12B and 12C, respectively, and collar portion 13A is electrically insulated from pole piece 19, all by insulation means 20, such as flame-sprayed alumina coated on each of the radial surfaces of the collar portions. Similarly, each of rims 14B, 14C and 14D is electrically insulated from disks 10A, 10B and 10C, respectively, by insulation means 23, such as flame-sprayed alumina coated on each of the radial surfaces of these rims. Disks 10A, 10B and 10C are fastened to pole piece or end cap 19, as by insulated bolts 18, to ensure their rotation in unison.

Each of disks 10A, 10B, 10C and 10D, and each of disks 12A, 12B, 12C and 12D, is comprised of electrically conductive, low magnetic reluctance material, such as iron or a 50% iron and 50% cobalt alloy, in order to facilitate axial passage of a large amount of magnetic flux through these disks. Each of disks 10a, 10B, 10C and 10D is electrically connected, at its innermost periphery, to collar portions 13A, 13B, 13C and 13D, respectively, of disks 12A, 12B, and 12C and pole piece or end cap 17, respectively, through a liquid metal conductor 11, such as sodium potassium alloy (NaK), bridging the gap therebetween. Similarly, each of disks 12A, 12B and 12C is electrically connected, at its outermost periphery, to rims 14B, 14C and 14D, respectively, each connection being made by a liquid metal conductor 11, such as NaK, bridging the gap therebetween. Although conductor 11 is generally illustrated as a liquid metal situated in predetermined locations, those skilled in the art will recognize that the liquid-solid interface regions are designed specifically to contain the liquid metal, as for example in the manner described and claimed in B. D. Hatch application Ser. No. 625,168, filed Oct. 23, 1975, now U.S. Pat. No. 3,989,968, issued Nov. 2, 1976, or in J. D. Hurley application Ser. No. 625,532, filed Oct. 24, 1975, now U.S. Pat. No. 4,027,184, issued May 31, 1977, both applications being assigned to the instant assignee. Alternatively, solid current collectors, such as carbon brushes, may be employed instead of liquid metal conductors 11.

Encircling outer or peripheral portion 14A of rotatable disk 10A, and rims 14B, 14C and 14D of rotatable disks 10B, 10C and 10d, respectively, is a field coil 25 comprised of conventional electrical conductor, typically copper, energizable through current leads 26 which may be brought out through a channel 28 in pole piece 17. Coil 25 is suitably supported by being friction-fitted into, or otherwise affixed to, a recessed portion 27 of pole piece 17, and is nowhere else in physical contact with any structural portion of the machine.

A second axially-stacked set of rotatable disks 30A, 30B, 30C and 30d, conveniently concentric with rotatable disks 10A, 10B, 10C and 10D, respectively, encircles field coil 25. Hence the axial stack of disks 30a, 30B, 30C and 30D is coaxial about the axial stack of disks 10A, 10B, 10C and 10D. The inner periphery of each of disks 30A, 30B, 30C and 30D is of diameter slightly greater than the outer diameter of field coil 25, to allow clearance for rotation of these disks about the coil. Disks 30A, 30B, 30C and 30D are fastened to pole piece 19, as by insulated bolts 31, to ensure their rotation in unison.

A second plurality of stationary disks 32B, 32C and 32D, concentric with stationary disks 12A, 12B and 12C, respectively, is positioned about a collar portion 33A, 33B and 33C, respectively, of rotatable disks 30A, 30B and 30C, respectively, while a stationary disk 32A is positioned about a shoulder portion 24 of magnetic pole piece 19. A stationary disk 32E is positioned about a shoulder portion 33D of rotatable disk 30D. Each of disks 30A–30D and 32A–32E is comprised of electrically conductive, low magnetic reluctance material, such as iron or a 50% iron and 50% cobalt alloy.

Each of stationary disks 32A, 32B, 32C and 32D has a peripheral rim 35A, 35B, 35C and 35D, respectively, extending axially about the periphery of rotatable disks 30A, 30B, 30C and 30D, respectively. Collar portions 33A, 33B and 33C are electrically insulated from disks 30B, 30C and 30D, respectively, and collar portion 33A is also electrically insulated from pole piece 19, by insulation means 36, such as flame-sprayed alumina, on each of the radially-facing surfaces of the collar portions. Similarly, peripheral rims 35A, 35B, 35C and 35D are electrically insulated from disks 32B, 32C, 32D and 32E, respectively, by insulation means 40, such as flame-sprayed alumina, on each of the radially-facing surfaces of the peripheral rims, and disk 32E is also electrically insulated from pole piece 17 by insulation means 40, such as flame-sprayed alumina, on the radial surface of a peripheral rim 16 of pole piece 17. Disks 32A, 32B, 32C, 32D and 32E are fastened against rotation by insulating bolts 37 which are anchored in a metallic frame 41 enclosing exposed rotating portions of the machine, while disks 30A, 30B, 30C and 30D are fastened to rotate in unison by insulating bolts 31. Each of disks 32A, 32B, 32C and 32D is electrically connected, at its innermost central periphery, to shoulder portion 24 of pole piece 19 and to collar portions 33A, 33B, 33C and 33D, respectively, through liquid metal conductor 11, such as NaK, bridging the gap therebetween, while each of disks 30A, 30B, 30C and 30D is electrically connected, at its outmost periphery, to peripheral rims 35A, 35B, 35C and 35D, respectively, through liquid metal conductor 11, such as NaK, bridging the gap therebetween. As previously mentioned, the liquid metal conductor is contained, for example, in the manner described and claimed in either of the aforementioned Hatch or Hurley applications. Here too, solid current conductors, such as carbon brushes, may be employed instead of liquid metal conductors 11.

Metallic casing 41 encloses exposed rotating portions of the machine, specifically pole piece 19. An opening in casing 41 allows access to a hollow, rotatable, output shaft 50, rotatable within bearing means 51. Armature connections are provided by a load current terminal 43 connected to stationary disk 32E and surrounded by insulation 44 such as flame-sprayed alumina, and a load current terminal 45 connected to conductive pole piece 17 and surrounded by insulation 46, such as flame-sprayed alumina. An insulating coating 47 about magnetic pole piece 17, frame 41, and the periphery of collar portions 35A, 35B, 35C and 35D ensures against inadvertent shortcircuiting of any of these stationary elements. A seal 52 against bearing means 21 protects against loss of liquid metal by seepage through bearing means 21, while a seal 53 against bearing means 50 performs the same function with respect to bearing means 50.

Figure 2:
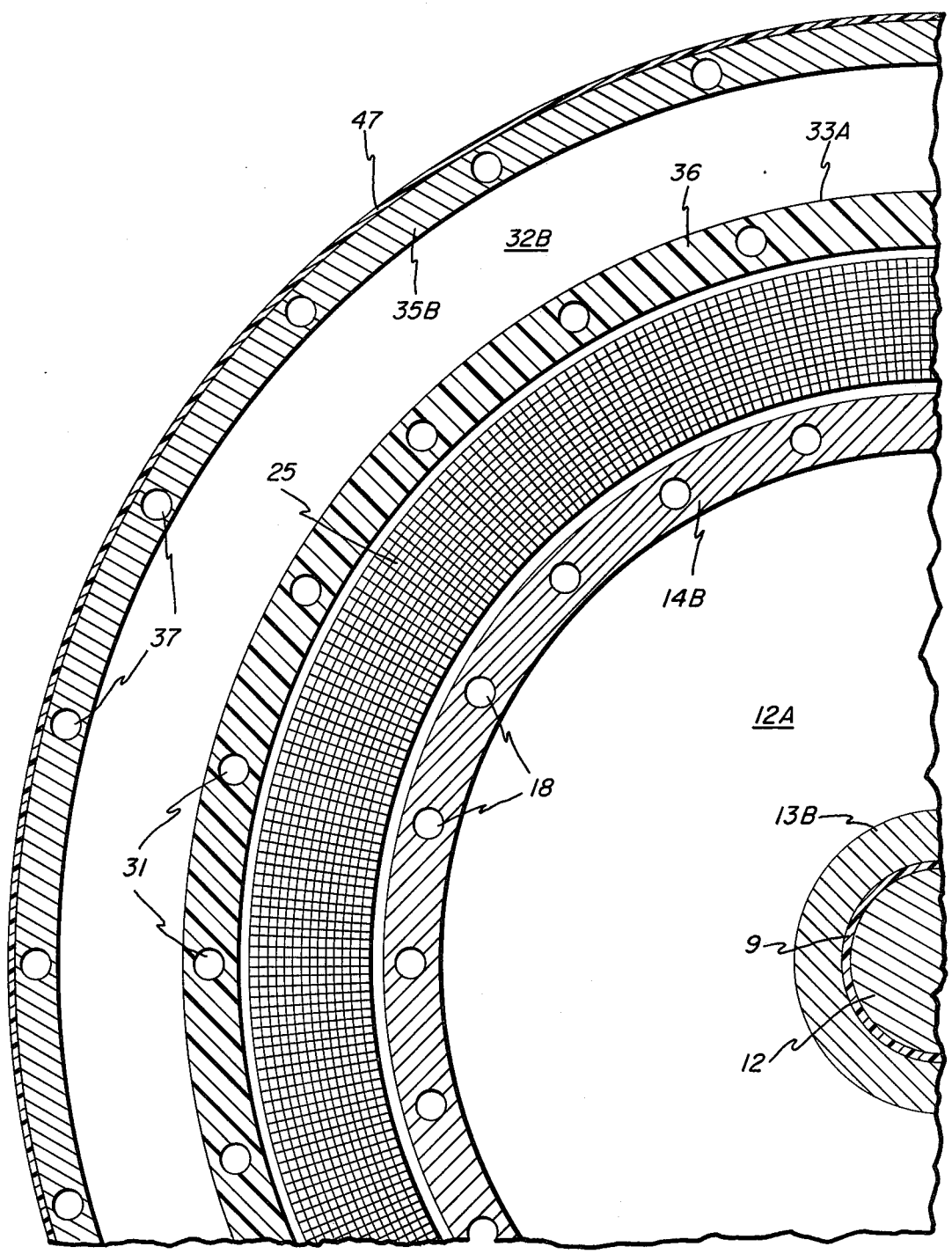
FIG. 2 is a sectional view taken along line 2—2 in FIG. 1.

FIG. 2, which is a section view taken along line 2—2 in FIG. 1, shows the relative relationships of the various components in the apparatus of FIG. 1, and may be referred to, where appropriate, in the description of operation of the apparatus, which follows.

In operation as a motor, field coil 25 is energized with direct current through leads 26. Being cyclindrical in shape, the coil establishes a magnetic flux flowing in one axial direction through disks 10A–10D and 12A–12C, and in the opposite axial direction through disks 30A–30D and 32A–32E. The flux path is completed through magnetic pole pieces 17 and 19, which effectively become magnetic poles from which magnetic flux lines are directed axially through the disks. D.C. armature current is supplied to the motor through terminals 43 and 45, the current path being constrained to follow the dotted line 54 shown in FIG. 1; that is, the arrangement of liquid metal brushes 11 together with the insulating layers between radial surfaces of adjacent disks and between shaft 12 and collar portions 13A–13D, forces the current to follow a radial path through each rotatable disk. Thus each of the rotatable disks is connected in series, so that the same armature current passes through each disk. The radially directed armature current and axially directed magnetic flux everywhere in each disk are essentially perpendicular to each other, and interact to produce a force on each disk tending to rotate each of the rotatable disks in the same direction with respect to the non-rotatable disks. Although the radial current direction through each of the rotatable disks in the outer disk stack is opposite to that of the rotatable disks in the inner disk stack, the axial magnetic fields through each of the disk stacks also are in opposite directions, so that the torque on the outer stack of rotatable disks always act in the same direction as the torque on the inner stack of rotatable disks. With all the rotatable disks bolted to pole piece 19, the torque acting on each of the rotatable disks is applied to pole piece 19, and output shaft 50 produces, as the output torque of the acyclic machine, the total of the torques acting on the rotatable disks.

The stationary disks on either side of field coil 25 serve, not only as a current return path for the rotating disks, but also to raise the permeance of the flux paths between opposed pole pieces 17 and 19 so as to provide a higher strength magnetic field cutting each of the rotatable disks in the machine. Moreover, by use of liquid metal brushes, friction is reduced to a minimum and problems, both electrical and mechanical, associated with brush wear are avoided.

In operation as a homopolar generator, field coil 25 is energized with direct current and shaft 50 is rotated by an external prime mover, causing motion of both stacks of rotatable disks about shaft 12. The rotatable disks thus cut the magnetic flux emanating from coil 25 and passing axially through the disks from each of pole pieces 17 and 19. As a result, a radially-directed voltage is established in each of the rotatable disks and, by virtue of the arrangement of liquid metal brushes 11 and the insulation coated on the radial surfaces of the disks, all these voltages are connected in seriesaiding fashion through each of the nonrotatable disks. By connecting a load (not shown) across terminals 43 and 45 of the machine, direct current may thereby be generated to pass through the load, following the direction of dotted line 54 in the machine. Terminals 43 and 45 thus become output terminals.

The foregoing describes a radial type acyclic machine in which rotatable disks are cut by magnetic flux everywhere along the flux path in the machine except at the ends of the machine. The machine functions as an acyclic motor exhibiting a high output torque for any predetermined size or weight, or, in the alternative, operates as an acyclic generator exhibiting a high output voltage for any predetermined generator size or weight.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:
1. A radial type acyclic machine comprising:
a central, axial shaft;
a first plurality of low magnetic reluctance, electrically conductive disks centered about said shaft and positioned in a first axial stack rotatable about said shaft;

a second plurality of low magnetic reluctance, electrically conductive disks positioned in a second axial stack about said first axial stack and rotatable about said shaft;

conductive means electrically interconnecting each disk in each of said first and second pluralities of disks; and means establishing an axially-directed magnetic field through each of said first and second pluralities of disks.

2. The apparatus of claim 1 wherein said means established an axially directed magnetic field includes a magnetic pole piece rotatable about said shaft and rigidly affixed to each of said first and second pluralities of disks.

3. The apparatus of claim 2 wherein said conductive means includes a plurality of disks rigidlly affixed to said shaft and positioned axially between successive disks in each of said first and second pluralities of disks, each rigidly affixed disk connected near its innermost periphery to the nearest rotatable disk on one of its sides and being connected near its outermost periphery to the nearest rotatable disk on the other of its sides.

4. The apparatus of claim 3 wherein said magnetic pole piece is electrically conductive and connected in series with the disks of said first and second pluralities of disks.

5. The apparatus of claim 1 wherein said means establishing an axially directed magnetic field includes a pole piece rotatable about said shaft and rigidly affixed to each of said first and second plurality of disks, said pole piece being electrically conductive and connected in series with the disks of said first and second pluralities of disks.

6. The apparatus of claim 1 wherein said conductive means includes liquid metal positioned to bridge a gap between rotating and stationary surfaces at two different radial locations on each rotating disk.

7. The apparatus of claim 2 wherein said conductive means includes liquid metal positioned to bridge a gap between rotating and stationary surfaces at two different radial locations on each rotating disk.

8. The apparatus of claim 1 wherein said means establishing an axially directed magnetic field comprises magnetic field generating means situated between said first and second axial stacks of disks.

9. The apparatus of claim 2 wherein said means establishing an axially directed magnetic field comprises magnetic field generating means situated between said first and second axial stacks of disks.

10. The apparatus of claim 8 including a magnetic pole piece situated at each end of said first and second axial stacks of disks.

11. The apparatus of claim 9 including a second magnetic pole piece rigidly affixed to said shaft, each of said magnetic poles being comprised of electrically conductive material and connected in series with each of said first and second pluralities of disks.

12. The apparatus of claim 10 wherein said magnetic field generating means situated between said first and second axial stacks of disks is rigidly affixed to one of said magnetic pole pieces, said one of said magnetic pole pieces being rigidly affixed to said shaft.

13. The apparatus of claim 1 wherein said means establishing an axially directed magnetic field includes first and second magnetic pole pieces situated at each axial end of said first and second pluralities of disks, said first pole piece being rotatable about said shaft and rigidly affixed to each of said first and second pluralities of disks, and said second pole piece being rigidly affixed to said shaft.

14. The apparatus of claim 2 wherein said magnetic pole piece is located at one axial end of each of said first and second axial stacks of disks, and further including a second magnetic pole piece rigidly affixed to said shaft at the opposite ends of said first and second axial stacks of disks.

* * * * *